United States Patent [19]

Rossi

[11] Patent Number: 4,501,818
[45] Date of Patent: Feb. 26, 1985

[54] PROCESS FOR THE PREPARATION OF CERAMIC POWDERS

[75] Inventor: Giulio A. Rossi, Shrewsbury, Mass.

[73] Assignee: Norton Company, Worcester, Mass.

[21] Appl. No.: 511,058

[22] Filed: Jul. 5, 1983

[51] Int. Cl.³ .................... C04B 35/00; C04B 35/48
[52] U.S. Cl. ........................................ 501/1; 423/266; 423/608; 501/103; 501/134; 501/152; 501/153; 501/154
[58] Field of Search ................ 423/266, 608; 501/103, 501/134, 152, 1, 153, 154

[56] References Cited

U.S. PATENT DOCUMENTS 3,334,962  8/1967  Clearfield ........................... 423/608
4,365,011  12/1982  Bernard et al. .................... 423/608

Primary Examiner—Helen M. McCarthy
Attorney, Agent, or Firm—Frank S. Chow

[57] ABSTRACT

Sub-micron sized powders of the ceramic metal oxides such as zirconia, alumina, titania, etc. are produced by precipitation from substantially anhydrous solutions of salts of the corresponding metal(s) with substantially anhydrous solutions of alkali metal hydroxides. The precipitates are subsequently washed with water to remove any residual soluble salt and/or solvent, then are dried and usually calcined. The powders thus produced are readily sintered to high density ceramic bodies after conventional pressing into the desired shape.

The process is especially suited to the production of zirconia powders, either pure or doped with conventional stabilizing oxides such as yttria. In a typical example, a zirconia powder doped with 5.4% by weight of yttria is prepared by adding a solution of zirconium tetrachloride and yttrium chloride in anhydrous ethanol to a solution of sodium hydroxide in anhydrous ethanol. After washing, drying at 105° C., and calcining at 500° C. for two hours, the powder is pressed at 5000 psi into a green body with a density of 1.46 Mg/m³. After one hour of sintering a 1600° C., the fired body has a density of 5.84 Mg/m³, which is 96% of the theoretical maximum.

14 Claims, 7 Drawing Figures

Scanning electron photomicrograph (SEM) of zirconia powder containing 5.4 w/o yttrium oxide, prepared according to the present invention, dried in oven at 105°C.

Scanning electron photomicrograph (SEM) of pure zirconia powder prepared according to the present invention, dried in oven at 105°C.

Scanning electron photomicrograph (SEM) of zirconia powder containing 5.4 w/o yttrium oxide, prepared according to the present invention, dried in oven at 105°C.

Scanning electron photomicrograph (SEM) of zirconia powder containing 5.4 w/o yttrium oxide, prepared according to the present invention, dried in oven at 105°C and subsequently calcined one hour in air at 500°C.

Photomicrograph in reflected light (1200x) of a polished and thermally etched section of a sintered disc of zirconia containing 5.4 w/o yttrium oxide, prepared according to the present invention; powder calcined at 500°C, disc pressed at 34 MPa, sintered in air, one hour at 1600°C.

Photomicrograph in reflected light (1200x) of a polished and thermally etched section of a sintered disc of zirconia containing 5.4 w/o yttrium oxide. Powder supplied by Toyo-Soda Co., Japan, used as received. Disc pressed at 34 MPa, sintered in air, one hour at 1600°C.

Photomicrograph in reflected light (1200x) of a polished and thermally etched section of a sintered disc of zirconia containing 5.4 w/o yttrium oxide. Powder supplied by ZIRCAR Corp., Florida, New York, used as received. Disc pressed at 34 MPa, sintered in air, one hour, at 1600°C.

Photomicrograph in reflected light (1200x) of a
polished and thermally etched section of a disc
of zirconia containing 12 w/o yttrium oxide.
Powder supplied by ZIRCAR Corp., Florida, New York,
used as received. Disc pressed at 34 MPa, sintered
one hour in air at 1600°C.

PROCESS FOR THE PREPARATION OF CERAMIC POWDERS

BACKGROUND OF THE INVENTION

1. Field of the Invention

This invention relates to the production of uniform sub-micron size ceramic powders suitable for sintering after pressing to give solid ceramic bodies of near-theoretical density. The invention is particularly applicable to the production of such powders of pure zirconia and of zirconia doped with known stabilizing oxides such as yttria, but it is also applicable to production of sub-micron sized powders of alumina, silica, titania, and mixtures of these with a variety of other oxides.

2. Description of the Prior Art

The most common method for the production of sub-micron sized powders of the ceramic oxides is precipitation or co-precipitation of an oxide precursor from aqueous solution of a salt of the metal or metals to be used. Commonly, oxides, hydroxides, oxycarbonates, oxalates, etc., all usually with varying degrees of hydration, are precipitated at an appropriate pH. In all these cases, the precipitate normally has the form of a gel, which presents serious practical processing problems: First, filtration is very difficult because of clogging of the pores of the filter. Second, desalting of the gel by washing is very tedious as a result of the filtration problem; moreover, gradual peptization of the gel to sol results from the gradual drop in electrolyte concentration induced by washing and worsens the filtration problem still further. Third, oven drying of the purified gel often yields unsinterable powders. (The worst adverse effects of drying can be avoided by replacing the water in the gel with an organic liquid before drying, but this requires extensive and expensive refluxing with the organic liquid in most cases and still produces powders with less than optimal sinterability.)

Other established prior art method for the production of sinterable zirconia powders include high temperature oxidation of zirconium chloride with oxygen and/or water vapor, hydrolysis or thermal decomposition of zirconium alkoxides, and hydrothermal reaction of zirconium metal or its alloys. These methods, however, require complex and expensive equipment and/or expensive starting materials and thus find relatively little industrial use.

The recent U.S. Pat. No. 4,365,011 to Bernard et al. discloses an alternative precipitation method for the preparation of sinterable zirconia powders. According to the Bernard teaching, a solution of appropriate metal salt precursors is formed in alcohol rather than in water. A precipitate is formed by the action of ammonia on such a solution; the precipitate is washed with a hydrophilic solvent to eliminate most residual water, dried, and calcined. The drying step is preferably accomplished by azeotropic distillation with a third solvent such as benzene which is capable of displacing both water and the alcohol used. From this and other indications in the Bernard specification, I have concluded that the precipitate formed according to their teachings is a gel, and therefore is subject to all the processing difficulties for gels described above.

SUMMARY OF THE INVENTION

I have discovered that a precipitate well suited to eventual conversion to ceramic bodies by sintering can be formed in alcoholic or other organic solvents without any evidence of gellation and the processing difficulties associated therewith. This result is achieved by the preparation of separate solutions in organic solvent of soluble salts of the metal or metals desired in the final ceramic powders and of substantially anhydrous alkali metal hydroxides, then adding the solution of the ceramic metal compounds to that of the hydroxides. A precipitate of a precursor of the ceramic oxide, usually mixed with an alkali metal salt which is also relatively insoluble in the organic solvent used, is quickly formed and may be separated from the solvent by any conventional means, such as filtration, centrifugation, or the like. The separated precipitate is then dried to remove substantially all of the organic solvent. Any undesirable residual salt may be removed by washing the dried precipitate with water, preferably hot, without the processing difficulties associated with gellation which are experienced when the precipitate is formed in the presence of more water. Washing with water is obviously more economical than washing with organic solvents as is required by the Bernard teachings.

The precipitate thus produced is dried at a temperature slightly above the boiling point of water, and is then usually calcined at a temperature of a few hundred degrees Celsius to remove adsorbed and otherwise physically bound water and/or organic solvent without impairing sinterability of the powder.

BRIEF DESCRIPTION OF THE DRAWINGS

The figures are photomicrographs made with a scanning electron microscope of the powders prepared according to this invention, and described as follows.

DESCRIPTION OF THE PREFERRED EMBODIMENTS

Figure 1:
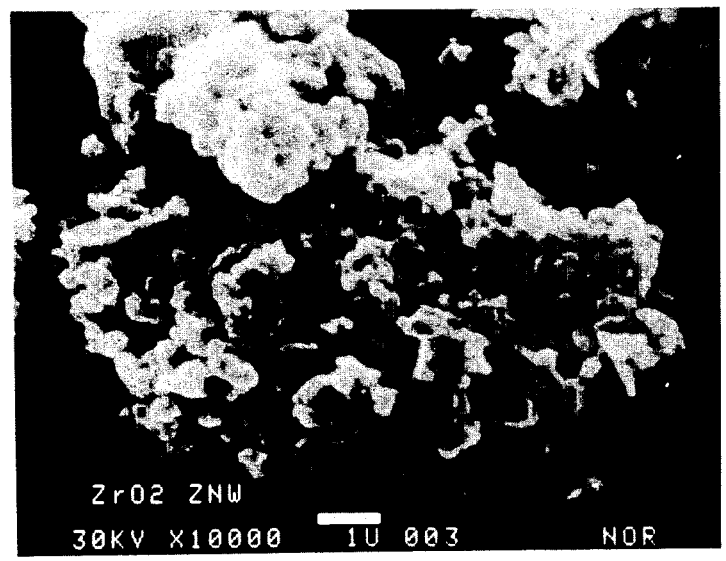
FIG. 1 is a scanning electron photomicrograph (SEM) of pure zirconia powder prepared according to the present invention, dried in oven at 105° C.

The organic solvent which I have found most suitable for the practice of my invention is commercial anhydrous ethanol. Commercial anhydrous methanol was also suitable. Other alcohols, ketones and other organic solvents may also be used, alone or in mixtures.

My preferred source of zirconium in solution was zirconium tetrachloride, which is readily soluble in ethanol. Yttrium chloride hexahydrate was used as the primary source of yttrium in alcohol solution. Yttrium nitrate can also be used. In general, any salt of the desired metal or metals with adequate solubility in the desired solvent and without adverse interactions with the other metal salts in the same solution may be used.

When articles primarily of zirconia are to be prepared, it is normally advantageous, as generally known in the art, to add small amounts of yttrium, magnesium, calcium, or other known stabilizing oxides to promote the crystallization of zirconia in the cubic phase. This applies to the powders prepared by the methods of my invention as it does to those prepared by other means, except that calcium hydroxide, which is slightly soluble in water, is likely to be partially leached from the precipitate by washing.

Primarily because of its relatively low cost, sodium hydroxide is my preferred source of hydroxide ions for use in the precipitation. However, other hydroxides which are sufficiently soluble in the solvent to be used would be expected to work as well. The amount of water in the hydroxide should be no more than 2% by weight, and less is preferable. The amount of hydroxide used is preferably that just sufficient stoichiometrically to accomplish the precipitation of the metal salts used as hydroxides.

After precipitation of the powders according to this invention and subsequent drying, the powder should be thoroughly washed to remove not only any salt, but any residual organic solvent, which may otherwise be converted to objectionable carbon residue on calcination. If the calcination is to be carried out in vacuum or in flowing oxygen, more solvent residue can be tolerated after washing, as it will be more readily removed during calcination.

For sintering, a little carbon can be tolerated because it will be converted to fugitive gases at a sufficiently low temperature so that it can escape through the remaining open pore structure of the incompletely sintered body. Larger amounts may give rise to retention in the final sintered body, however, and such retention is generally undesirable.

Although the description has been given primarily in terms of the preparation of zirconia powders, it should be understood that it is equally applicable to the preparation of powders of silica, titania, alumina, and many other oxides and mixtures thereof.

The invention may be illustrated by the following examples:

Example 1: Preparation of Undoped Zirconia

Twenty grams of $ZrCl_4$ powder (99.6% purity product of Alfa Products) was dissolved in about 500 ml of anhydrous ethanol (Baker Analyzed Reagent Grade) to form the first solution. The second solution consisted of 13.7 gm of NaOH (Baker Analyzed Reagent Grade) pellets dissolved in about 500 ml of the same alcohol.

The first solution was poured slowly into the second, with constant stirring. A very fine precipitate formed very rapidly and slowly settled to give a clear supernatant liquid. The liquid was decanted and the precipitate dried in a stainless steel pan on a laboratory hot plate. The dried powder was then washed with distilled water until no chloride ions were detectable in the wash water when it was tested with a nitric acid solution saturated with silver nitrate. The powder was then dried at about 105° C. in an oven, and then subjected to examination with a scanning electron microscope. The resulting photomicrograph is shown as FIG. 1 of the drawings. The powder is clearly sub-micron in size and would be expected to sinter readily. Indeed, the powder was closely comparable in all properties tested to one prepared by the prior art method of hydrolysis of zirconium n-propoxide, a technique which is generally recognized as yielding some of the purest and highest quality zirconia powders now available.

Example 2: Preparation of Yttria-Doped Zirconia

Figure 2:
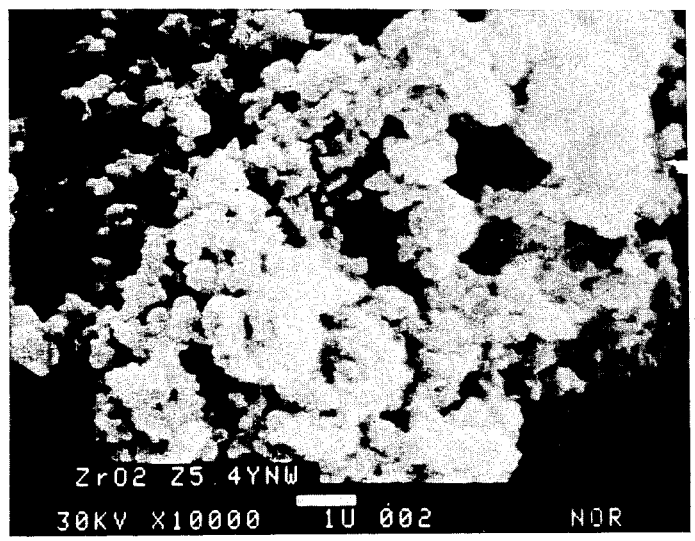
FIG. 2 is a scanning electron photomicrograph (SEM) of zirconia powder containing 5.4 w/o yttrium oxide, prepared according to the present invention, dried in oven at 105° C.
Figure 3:
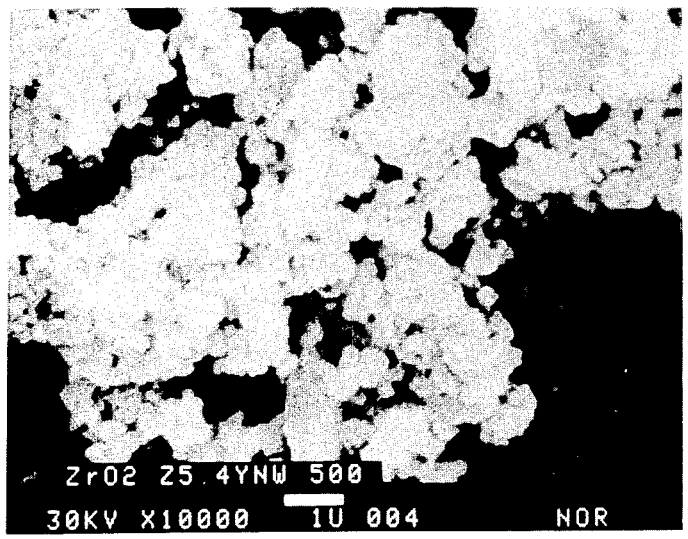
FIG. 3 is a scanning electron photomicrograph (SEM) of zirconia powder containing 5.4 w/o yttrium oxide, prepared according to the present invention, dried in oven at 105° C. and subsequently calcined one hour in air at 500° C.
Figure 4:
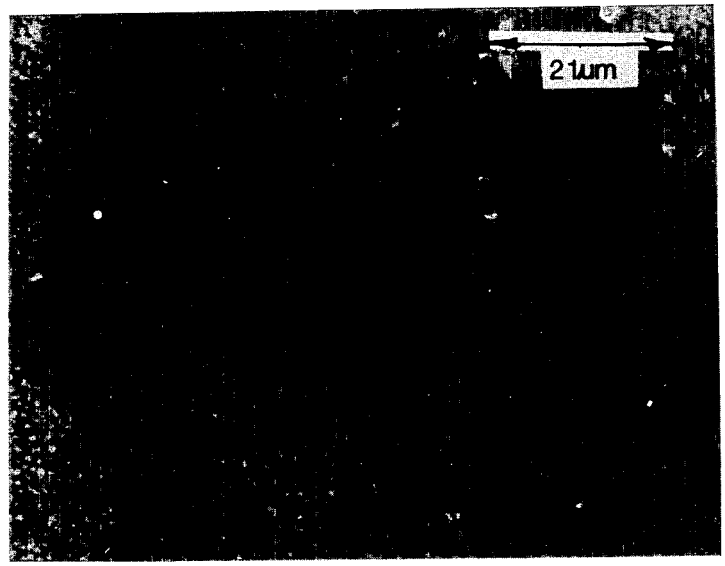
FIG. 4 is a photomicrograph in reflected light (1200×) of a polished and thermally etched section of a sintered disc of zirconia containing 5.4 w/o yttrium oxide, prepared according to the present invention; powder calcined at 500° C., disc pressed at 34 MPa, sintered in air, one hour at 1600° C.
Figure 5:
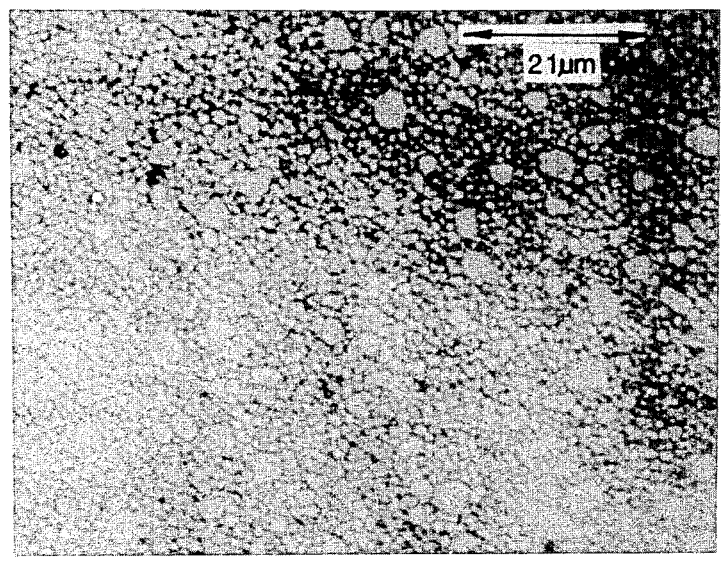
FIG. 5 is a photomicrograph in reflected light (1200×) of a polished and thermally etched section of a sintered disc of zirconia containing 5.4 w/o yttrium oxide. Powder supplied by Toyo-Soda Co., Japan, used as received. Disc pressed at 34 MPa, sintered in air, one hour at 1600° C.
Figure 6:
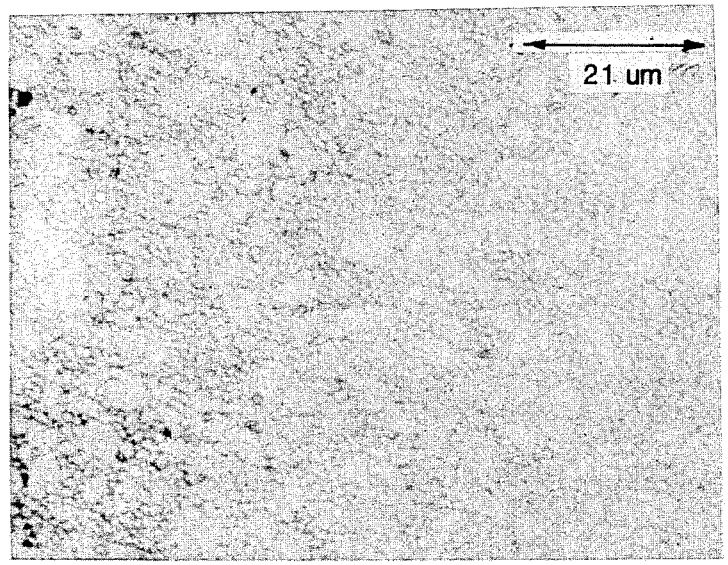
FIG. 6 is photomicrograph in reflected light (1200×) of a polished and thermally etched section of a sintered disc of zirconia containing 5.4 w/o yttrium oxide. Powder supplied by ZIRCAR Corp., Fla., N.Y., used as received. Disc pressed at 34 MPa, sintered in air, one hour, at 1600° C.
Figure 7:
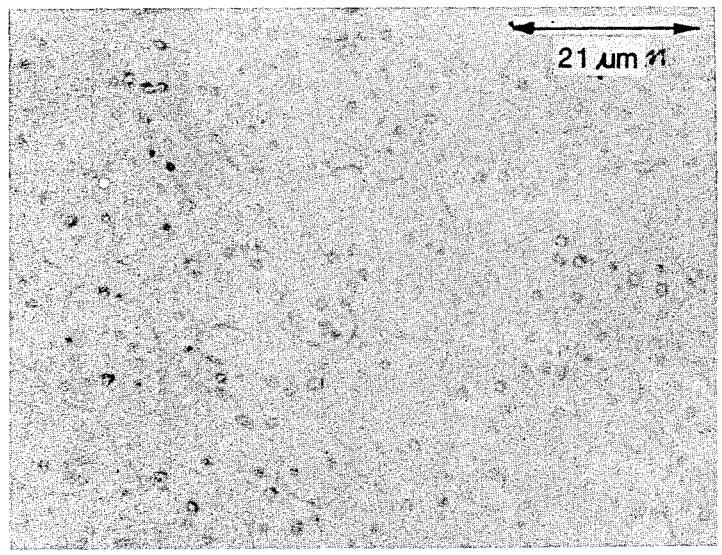
FIG. 7 is a photomicrograph in reflected light (1200×) of a polished and thermally etched section of a disc of zirconia containing 12 w/o yttrium oxide. Powder supplied by ZIRCAR Corp., Fla., N.Y., used as received. Disc pressed at 34 MPa, sintered one hour in air at 1600° C.

Amounts of 50 gm of $ZrCl_4$ and 4.05 gm of $YCl_3 \cdot 6H_2O$ (both reagent grade products from Alfa products) were dissolved in about 500 ml of anhydrous ethanol as in Example 1. NaOH pellets as in Example 1 weighing 35.85 gm were dissolved in about 900 ml of the same alcohol to form the second solution. The warm first solution was slowly poured into the hot second solution while stirring, and a precipitate formed rapidly. Stirring was continued for five minutes, after which time there was no evidence of additional precipitation. (A sample of the liquid was removed and diluted with water to test its pH, which was 6. Additional NaOH pellets were added to another sample of the supernatant liquid without evidence of further precipitation.) The precipitate was separated and prepared for microscopic examination as in Example 1. The resulting photomicrograph is shown as FIG. 2 of the drawings. As in Example 1, the powder is submicron in size.

A sample of the powder as prepared for microscopic examination was prepared for sintering by calcining in air at 500° C. for two hours. The calcined powder was mixed with a conventional binding aid (5% by weight of the powder of an aqueous solution of 1% by weight methyl cellulose) and then pressed with a force of 5000 pounds per square inch (psi), equivalent to 34 megapascals (MPa), into a circular disc 2.5 cm in diameter for test firing. The green density of the disc was 1.58 megagrams per cubic meter ($Mg/m^3$). The green disc was sintered in air in a conventional furnace at 1600° C. for one hour, along with green discs made by identical processing of three commercial powders: Toyo-Soda powder with 5.4% yttria by weight, designated T-S; ZIRCAR 5.4% yttria by weight, designated Z-5; and ZIRCAR 12% yttria by weight, designated Z-12. The powder prepared according to this Example is designated E-2. Results of sintering these four types of green discs are shown in the table below.

TABLE

| Desig- | Effect of Sintering $Y_2O_3$—Doped $ZrO_2$ Green Ware | | | | |
|---|---|---|---|---|---|
| | Densities, $Mg/M^3$ | | Percent Changes on Firing: | | |
| nation | Green | Fired | Weight | Volume | Diameter |
| T-S | 2.59 | 5.99 | 6.1 | 58 | 25 |
| Z-5 | 1.91 | 5.75 | 7.3 | 66 | 28 |
| Z-12 | 1.89 | 5.94 | 6.4 | 68 | 29 |

TABLE-continued

| | Effect of Sintering Y$_2$O$_3$—Doped ZrO$_2$ Green Ware | | | | |
|---|---|---|---|---|---|
| Desig- | Densities, Mg/M$^3$ | | Percent Changes on Firing: | | |
| nation | Green | Fired | Weight | Volume | Diameter |
| E-2 | 1.46 | 5.84 | 7.4 | 75 | 37 |

The results in this table show that the product of the present invention makes lower density green ware but comparable density fired ware, compared with conventional powders.

Example 3: Change in Solvent

The starting materials and processing for this example were identical to those for Example 2, except that commercial grade methanol, containing up to 1.5% of water, was used as the solvent rather than anhydrous ethanol. The fired density of discs made with powders prepared by this variation was 5.53 Mg/m$^3$, significantly less than that for the powders prepared in anhydrous alcohol but still acceptable for some purposes.

I claim:

1. A process for the preparation of uniform, submicron size sinterable metal oxide ceramic powders, comprising the steps of:
   (a) forming a substantially anhydrous first solution of salts of all the metals whose oxides are present in said metal oxide ceramic powders in the proportions present therein and forming a substantially anhydrous second solution of alkali metal hydroxides in the amount stoichiometrically required to react with the metal content of said first solution;
   (b) adding said first solution to said second solution, so as to form without evidence of gellation a solid precipitate containing substantially all the ceramic metal content originally in said first solution;
   (c) separating said solid precipitate from the bulk of its supernatant liquid;
   (d) heating said solid precipitate to remove residual solvent;
   (e) washing said solid precipitate with water sufficiently to remove substantially all water-soluble salts therefrom; and
   (f) drying said washed solid precipitate at a temperature in excess of the boiling point of water.

2. A process according to claim 1, comprising the additional step of calcining said dried precipitate at a temperature of at least 500° C. to remove physically bound water and solvents.

3. A process according to claim 2, wherein said first solution comprises a zirconium salt.

4. A process according to claim 3, wherein said first solution comprises an yttrium salt in an amount equal to at least 3% by weight of the content of said zirconium salt.

5. A process according to claim 1, wherein said first solution comprises a zirconium salt.

6. A process according to claim 5, wherein said first solution comprises an yttrium salt in an amount equal to at least 3% by weight of the content of said zirconium salt.

7. A process according to claim 1, wherein said first solution or said second solution is formed with anhydrous ethanol as the solvent.

8. A process according to claim 2, wherein said first solution or said second solution is formed with anhydrous ethanol as the solvent.

9. A process according to claim 3, wherein said first solution or said second solution is formed with anhydrous ethanol as the solvent.

10. A process according to claim 4, wherein said first solution or said second solution is formed with anhydrous ethanol as the solvent.

11. A process according to claim 1, wherein said alkali metal hydroxide is sodium hydroxide.

12. A process according to claim 2, wherein said alkali metal hydroxide is sodium hydroxide.

13. A process according to claim 3, wherein said alkali metal hydroxide is sodium hydroxide.

14. A process according to claim 4, wherein said alkali metal hydroxide is sodium hydroxide.

* * * * *